United States Patent

Sakashita et al.

[11] Patent Number: 5,477,096
[45] Date of Patent: Dec. 19, 1995

[54] LAMINATED CORE FOR A MOTOR

[75] Inventors: Hiroshi Sakashita; Eiji Arasaki, both of Nagano, Japan

[73] Assignee: Kabushiki Kaisha Sankyo Seiko Seisakusho, Nagano, Japan

[21] Appl. No.: 166,876

[22] Filed: Dec. 15, 1993

[30] Foreign Application Priority Data

Dec. 16, 1992 [JP] Japan ................... 4-091384 U

[51] Int. Cl.$^6$ .................................................. H02K 1/00
[52] U.S. Cl. ........................................ 310/216; 310/45
[58] Field of Search ........................ 310/216, 217, 310/269, 45, 43, 254, 261; 336/219, 216

[56] References Cited

U.S. PATENT DOCUMENTS

| 3,122,667 | 2/1964 | Baciu | 310/45 |
| 3,194,993 | 7/1965 | Hackney et al. | 310/43 |
| 3,646,374 | 2/1972 | Jordan | 310/45 |
| 4,940,913 | 7/1990 | Fritzsche | 310/216 |

FOREIGN PATENT DOCUMENTS

| 2310012 | 11/1976 | France . |
| 1056251 | 4/1959 | Germany . |
| 1538885 | 4/1970 | Germany . |
| 2238755 | 2/1974 | Germany . |
| 934287 | 8/1963 | United Kingdom . |

*Primary Examiner*—R. Skudy
*Attorney, Agent, or Firm*—Sughrue, Mion, Zinn, Macpeak & Seas

[57] ABSTRACT

A laminated core for a motor includes a plurality of core members made of magnetic material and which are laminated to form laminated core members; insulating layers formed on the surfaces of the laminated core members, and a wire wound on the insulating layer of the laminated core members, wherein the insulating layers are respectively formed on the core members located on the upper and lower sides of the laminated core in the laminate direction.

8 Claims, 4 Drawing Sheets

LAMINATED CORE FOR A MOTOR

BACKGROUND OF THE INVENTION

1. Field of the Invention

The present invention relates to the structure of a laminated core for a motor.

2. Related Art

The cores used for the rotor and stator of a motor are generally of the laminated type. The following procedural steps are taken for assembling the laminated core.

1) To laminate a preset number of core members in a state that those members are put in the same punched direction. The stuff members are made of magnetic material and are each punched to have a preset pattern by a punching machine.

2) To press fit the laminated stuff members into a laminated core.

3) To wash the laminated core to remove rust preventing oil.

4) To form an insulating layer on a specified area on the surface of the laminated core by a powder coating method, for example. The powder coating method is generally a called electrostatic spray painting method. In this method, electrostatically charged insulation powder is sprayed over the earthed core, the insulation powder particles attached to the core are welded to form an insulating layer.

FIGS. 10 through 12 diagrammatically show the structure of a laminated core constructed through the procedural steps as just mentioned. A number of core members 56 (see FIG. 11) are placed one layer upon another to form a laminated core 50. The laminated core 50 is provided with a plural number of protruded poles 52 radially extending from the center of the core. Each of the protruded poles 52 has a circumferentially extended part 53 at the distal end thereof. In the construction of the laminated core 50, insulating layers 54 are layered on the upper and lower surfaces of the outer part of the core member 56 as viewed in the laminating direction. The insulating layer 54 is required for insulating the core from the winding wire. The insulating layer 54 is formed on the area on which the winding wire is wound, viz., the area including the entire surface of each insulating layer 54 and defining slots 58 for receiving coil.

In forming the core member 56, it is punched to have a preset pattern by a punching machine. The edge of one of the surfaces of the core member 56 is crooked by the punching process. In laminating the core members 56, those members are layered in a state that the crooked faces 59 thereof are put in the same direction as shown in FIG. 12. Then, those laminated members are driven together, and the specified areas thereof are covered with insulating layers 54.

In the construction of the laminated core 50, the core members 56 are laminated in a state that the crooked faces 59 of the core members 56, which result from the punching process, are put in the same direction. The crooked face 59 occupies an areal part of one of the surfaces, located closer to the distal end of the core member 56. A thick insulating layer (of 0.25 to 0.3 mm thick) is formed to cover the sharp edge of the crooked face 59. The formation of the thick insulating layer creates various problems. A large amount of expensive insulating material is used. The size of the core part having the winding wire placed thereon is increased. This makes it difficult to reduce the motor thickness. Since the wire is coiled on the thick insulating layer, the required wire for the winding is inevitably long. The use of a long winding wire results in an increase of the winding resistance, and a decrease of the startup torque of the motor, viz., deterioration of the motor characteristic.

SUMMARY OF THE INVENTION

With the view of solving the above problems, the present invention has an object to provide a laminated core for a motor in which the insulating layer has a satisfactory insulation function but is thin, thereby reducing the motor thickness and improving the motor characteristic.

According to an aspect of the present invention, there is provided a laminated core for a motor comprising: a plurality of core members made of magnetic material are laminated to form laminated core members; insulating layers formed on the surfaces of the laminated core members, and a wire wound on the insulating layer of the laminated core members, wherein the insulating layers are respectively formed on the core members located on the upper and lower sides of the laminated core in the laminate direction.

As described above, in the laminated core for a motor of the invention, the insulating layers are formed on only the core members of the upper and lower cores of the laminated core. The height of the laminated core with the winding wound thereon is reduced when compared with the conventional one. A further thin motor can be realized. The required length of the winding wire is reduced. As a result, the winding resistance is decreased and reduction of the startup torque is prevented.

In the upper and lower cores of the laminated core, the crooked face of the core member are directed inward. In other words, the sharp edges of the crooked faces are never raised from the side walls of the laminated core. Therefore, a thin insulating layer of the core member may be used while keeping a good insulation. This results in cost reduction and reduction of the cross sectional area of the protruded pole. Accordingly, the motor characteristic, such as startup torque, is improved.

DETAILED DESCRIPTION OF THE PREFERRED EMBODIMENTS

The preferred embodiments of a laminated core for a motor according to the present invention will be described with reference to FIGS. 1 through 9.

First Embodiment

Figure 1:
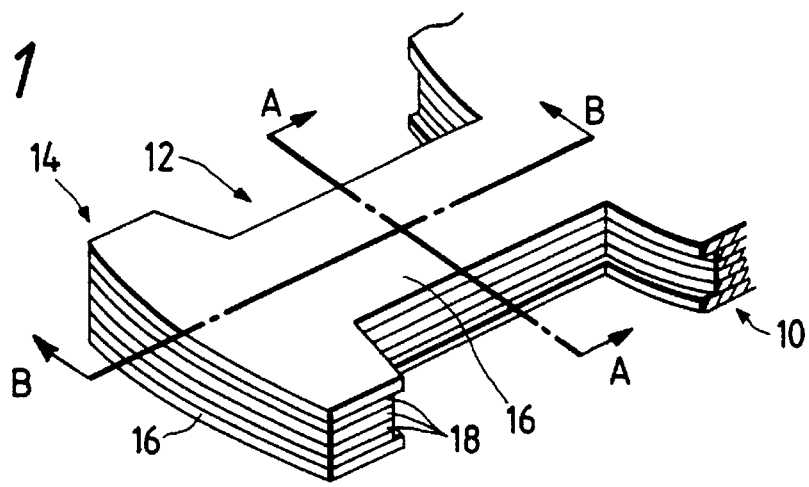
FIG. 1 is a perspective view showing a first embodiment of a laminated core for a motor according to the present invention.

Referring to FIG. 1, there is illustrated in enlarged form a key portion of the first embodiment of a laminated core 10 with a plural number of protruded poles 12 radially extending from the center of the core. The illustration shows one protruded pole 12 typically.

In FIG. 1, the distal end of the protruded pole 12 is circumferentially extended to form an extended portion 14.

The laminated core 10, as will be described in detail later, is formed of a stack of laminated core members 18 (the number of the stuff members is three in the instance illustrated, and these stuff members are coated with insulating layers) forming the medium part of the laminated core 10, and a pair of cores 16 and 16 (whose stuff member is coated with an insulating layer) cooperating to sandwich the stack of the core members 18.

Figure 2A:
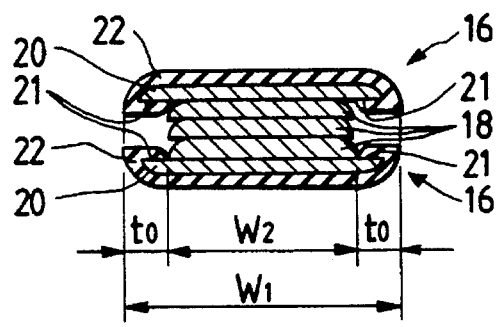
FIG. 2 (a) and (b) are cross sectional views taken on line A—A in FIG. 1.
Figure 2B:
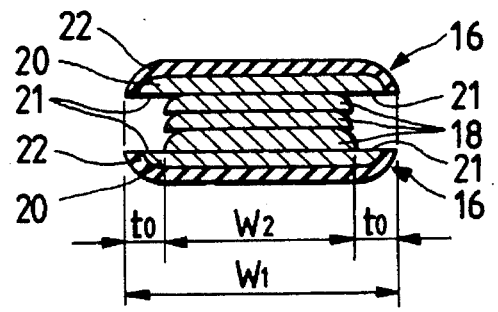

The cores 16 and 16, as shown in FIGS. 2 (a) and (b) and 3, are constructed such that insulating layers 22 are formed on at least the surfaces of core members 20 and 20 on which the winding is placed.

The core members 20 and 20 and the medium stack of the core members 18 and 18 are formed in a manner that plate members made of magnetic material are punched out to have preset patterns by a punching machine.

One of the surfaces of the core member 18 and the core member 20 has a face 21 (referred to as a crooked face) crooked by the punching process.

When the cores 16 and 16 including the core members 20 and 20 coated with the insulating layers 22, and the medium stack of core members 18 are laminated together, the cores 16 and 16, which are located on the outmost sides when viewed in the laminating direction, are placed on the surfaces of the core members 20, which have the crooked faces 21.

Thus, the crooked faces 21 of the two core members 20 are disposed facing each other, with the medium stack of the core members 18 being inserted therebetween. It is noted here that in the structure of the laminated core 10, the crooked faces 21 of the cores 16 are directed inward. In other words, the sharp edges of the crooked faces 21 do not form the outward protruded edges of the laminated core 10.

As shown in FIGS. 2 (a) and (b), the width of the core members 20 forming the cores 16 and 16 is larger than the width of the medium stack of core members 18. The width of the cores 16 and 16 including the insulating layers 22 is also larger than the width of the medium stack of core members 18.

More exactly, these width relation is expressed by:

$$W1 = W2 + 2to,$$

where,
W1: width of the core 16
W2: width of the core member 18
to: length of the protruded part of the core 16 from the core member 18.

Figure 5:
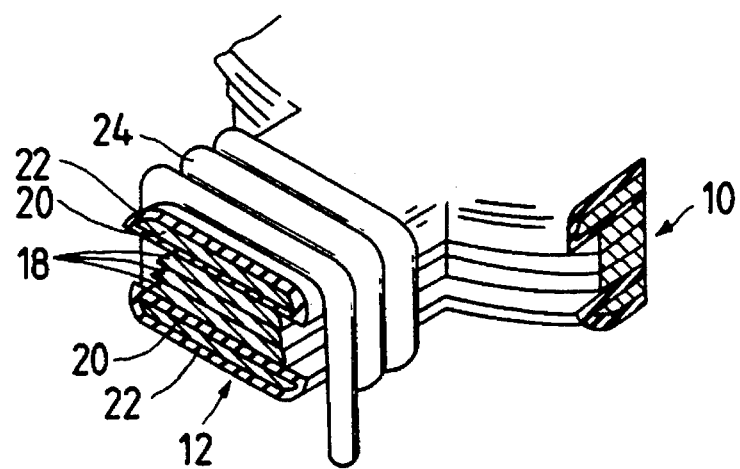
FIG. 5 is a perspective view, partly in cross section, showing a part of the laminated core according to the first embodiment, the illustration showing the laminated core having a winding put thereon.
Figure 6:
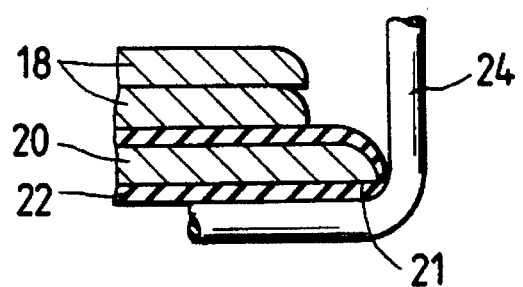
FIG. 6 is an elevational view in section of the laminated core of a motor illustrated in FIG. 5.

Thus, the end face of the core 16 is protruded from the core member 18. With this width difference, when a winding 24, as shown in FIG. 5, is put on the protruded poles 12, the winding 24 never contacts with the core member 18, so that no shortcircuiting takes place. Therefore, there is no need of forming the insulating layer on the core member 18.

In other words, the length of the protruded part is so selected that the winding 24, when put on the protruded poles, does not contact with the surfaces of the core members not covered with the insulating layers.

To insulate the portions of the laminated core 10, that should be electrically insulated from the winding 24, the end faces of the cores 16 and 16 are protruded from the end faces of the core members 18.

Figure 3:
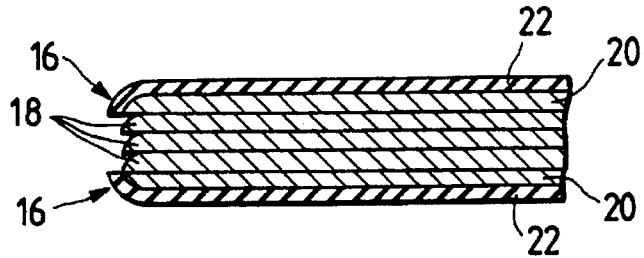
FIG. 3 is a cross sectional view taken on line B—B in FIG. 1.
Figure 4:
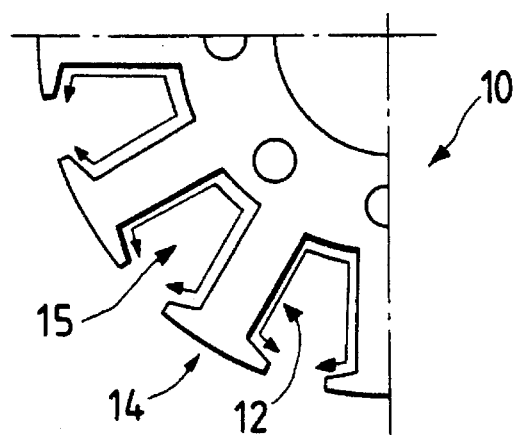
FIG. 4 is a plan view showing a part of the laminated core, the illustration showing a regional portion to which the structure of the first embodiment is applied.

That is, as shown in FIGS. 1 and 4, the end faces of the cores 16 and 16 are protruded from the end faces of the core members 18 when viewed in the plane of the side walls of the extended portion 14, the protruded pole 12, and the base part of the laminated core 10, which define the slot 15. There is no need of insulating the end faces of the extended portions 14. Accordingly, the core members 20, 20, and 18 may be flush with one another on this end face of the extended portion 14, as shown in FIG. 3. The end faces of the cores 16 and 16 and the core members 18 may also be flush with one another on both sides of the extended portion 14, as shown in FIG. 1.

As described above, in this embodiment, in the structure of the laminated core 10, the crooked faces 21 of the cores 16 having sharp edges are directed inward. Accordingly, the side walls of the laminated core 10 is free of the sharp edges of the crooked faces 21. The insulating layers 22 are held even at the ends of the cores 16 and 16.

Let us consider a case where the crooked faces of the cores 16 and 16 are directed outward. When the winding 24 is put on the protruded pole, the sharp edge of the crooked face 21 is firmly wound by the winding. Under this condition, the winding 24 is forcibly pushed against the insulating layer 22. In an extreme case, the edge of the crooked face 21 of the core breaks through the insulating layer 22, so that the core member 20 comes in contact with the winding 24. This establishes a short circuit between the core member 20 and the winding 24.

However, in the first embodiment, the insulating layers 22 are held even at the ends of the cores 16 and 16. Therefore, the core member 20 does not come in contact with the winding 24, and the shortcircuiting of them will never happen.

Thus, in this embodiment, there is no fear of establishing a short circuit between the winding 24 and the core member 20 at the edge of the crooked face 21. Therefore, the insulating layer 22 formed on the core member 20 may remarkably be reduced up to, for example, 30 to 40 μm, when comparing with the insulating layer of the conventional laminated core for the motor.

This feature brings about many advantages. The amount of insulating material for coating is reduced. This leads to cost reduction. The cross sectional area of the protruded pole may be reduced. Accordingly, a length of the winding wire used for a required number of turns of the wire may be reduced when comparing with the conventional one. Accordingly, the wire resistance is reduced and hence the motor characteristic, such as a startup torque, is improved.

The thin insulating layer may be formed by any suitable process, such as chemical vapor deposition (CVD) process. Of course, this process is not limit by this embodiment.

The procedure of assembling the laminated core for a motor according to the first embodiment will briefly be described.

1) Two type of core members with different patterns, core members 18 and 20, are punched to have preset patterns.

2) Cores 16 are manufactured.

An insulating layer 22 is formed on a portion (of the surface) of the core member 20 where it is possibly brought into contact with the winding by the above-mentioned method.

The formed insulating layer 22 covers the crooked portion, which results from the punching process. If required, it is formed so as to cover the entire surface of the core member 20.

3) The core 16 (core member 20) constituting the lower side of the laminated core 10 is set in a state that the crooked face 21 of the core member is directed upward.

4) A preset number of core members 18 are stacked on the lower core 16 set in the step 3) above. The crooked faces 21 of the core members 18 may be directed either upward or downward.

5) The core (core member 20) constituting the upper side of the laminated core 10 is set in a state that the crooked face 21 of the core member is directed downward.

6) The assembly of the core members 18 and 20 thus stacked is driven together, with a punch, for example, into a one-piece construction, or a laminated core 10.

In this embodiment of the invention, the shape (size) of the core member 18 is different from that of the core member 20. Those stuff members may be formed to have the same shape unless the medium stack of core members 18 comes in contact with the winding. In this case, the core member 20 may be used for the core member 18.

Further, only the cores 16 each consisting of the core member 20 covered with the insulating layer 22 may be laminated to form the laminated core 10, not using the core members 18, if a necessary motor characteristic is secured.

In the construction of FIG. 2(*a*), the insulating layers 22 partially cover the crooked faces 21 of the upper and lower cores 16.

In the construction of FIG. 2(*b*), the insulating layers 22 entirely cover the crooked faces 21 of the upper and lower cores 16 (including the surfaces of these cores on which the winding is to be placed).

Second Embodiment

Some modifications of the laminated core for a motor according to the present invention will be described.

Figure 7A:
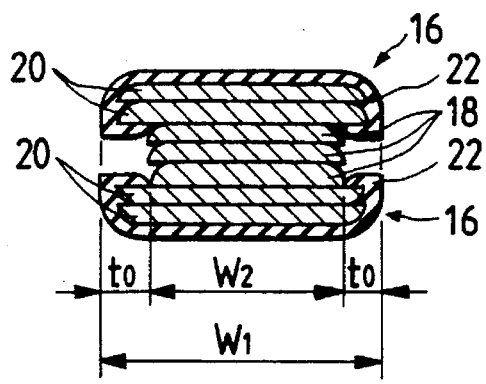
FIG. 7 (a) and (b) are showing cross sectional views of a second embodiment of a laminated core for a motor of the present invention.
Figure 7B:
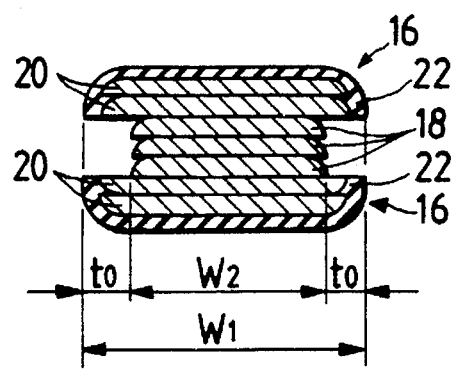

In the second embodiment shown in FIG. 7, each of the upper and lower cores 16 and 16 is constructed such that two core members 20 of the same shape are laminated. An insulating layer 22 is formed on the surface of the laminated core members 20. When a winding wire is wound on the laminated core, the winding wire is brought into contact with the core members 18 at specific numbers of turns of the wire and specific values of tension applied to the wire.

To prevent this contact, each core 16 is formed by laminating two core members 20 and forming an insulating layer on the surface of the laminated stuff members. The upper and lower cores thus formed sandwich the medium stack of core members 18.

The crooked faces 21 of the laminated core members 20 of the upper and lower cores 16 and 16 are disposed opposite to each other.

The width W1 of the cores 16 and 16, the width W2 of the core members 18, and the length of the protrusion of the cores 16 and 16 from the medium stack of the core members 18 at both ends of the cores, as in the first embodiment, are given by the following equation $$W1=W2+2to.$$

The second embodiment, like the first embodiment, may achieve the beneficial effects.

The construction difference between the structures of FIGS. 7(*a*) and 7(*b*) is the same as that of the structure of FIGS. 2(*a*) and 2(*b*). Therefore, the detailed description is omitted.

Third Embodiment

Figure 8A:
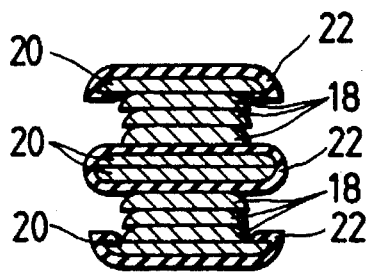
FIG. 8 (a) and (b) are showing cross sectional views of a third embodiment of a laminated core for a motor of the present invention.
Figure 8B:
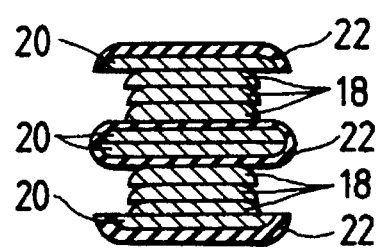

A third embodiment of the laminated core for a motor shown in FIG. 8 is provided in that another core 16 (a core member 20 with an insulating layer 22) is inserted into the mid location of the medium stack of core members 18 of the first embodiment shown in FIGS. 1 through 5.

In the construction of the core 16 (core members 20), a pair of core members 20 are laminated in state that the crooked faces 21 thereof are directed opposite to each other. An insulating layer 22 is formed on the surface of the thus laminated core members 20.

The core members 20 of the intermediate core and those 20 of the upper and lower cores are of the same type. Accordingly, both ends of the intermediate core are extended sideward beyond the medium stack of core members 18. The technical idea of the third embodiment is useful when it is applied for the laminated core structure of which the number of core members 18 of the medium stack of core members is large. The reason for this is that the insulating layer 22 of the intermediate core 16 also serves to insulate the winding.

The construction difference between the structures of FIGS. 8(*a*) and 8(*b*) is the same as that of the structure of FIGS. 2(*a*) and 2(*b*). Therefore, the detailed description is omitted.

Fourth Embodiment

Figure 9:
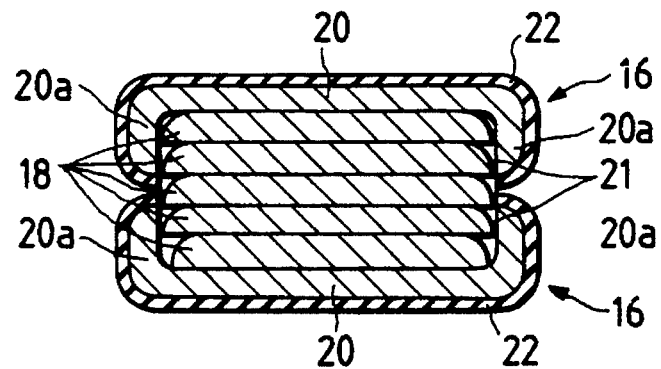
FIG. 9 is showing a cross sectional view of a fourth embodiment of a laminated core for a motor of the present invention.
Figure 10:
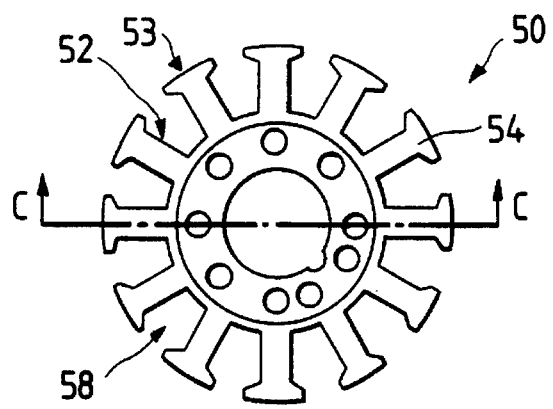
FIG. 10 is a plan view showing a conventional laminated core for a motor.
Figure 11:
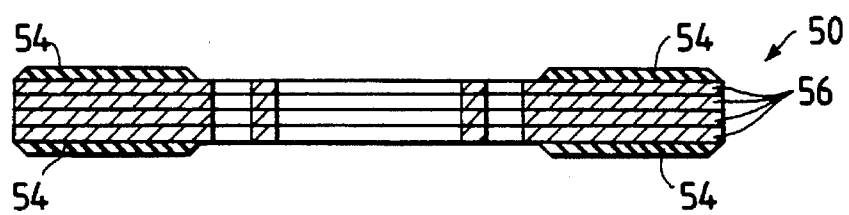
FIG. 11 is a cross sectional view taken on line C—C in FIG. 10.
Figure 12:
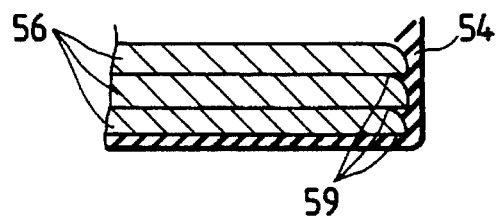
FIG. 12 is an enlarged cross sectional view showing a part of the conventional laminated core.

In the fourth embodiment of the laminated core according to the present invention shown in FIG. 9, a core member 20 with an insulating layer 22 formed thereover are bent, at both ends, toward the side walls of the medium stack of core members 18. The bent portions of the core member 20 are designated by reference numeral 20*a*.

In this embodiment, the upper and lower cores having the crooked faces 21 are laminated as in the previous embodiments, and then bent at both ends to form bent portions 20*a*. With this structure, each crooked face 21 is directed toward the inner side of the bent portions 20*a*, further providing an enhanced insulation.

The laminated cores of the first to fourth embodiments are applicable for both the stator and the rotor.

As described above, in the laminated core for a motor of the invention, the insulating layers are formed on only the core members of the upper and lower cores of the laminated core. The height of the laminated core with the winding wound thereon is reduced when comparing with the conventional one. A further thin motor can be realized. The required length of the winding wire is reduced. As a result, the winding resistance is decreased and reduction of the startup torque is prevented.

In the upper and lower cores of the laminated core, the crooked face of the core member are directed inward. In other words, the sharp edges of the crooked faces are never raised from the side walls of the laminated core. Therefore, a thin insulating layer of the core member may be used while keeping a good insulation. This results in cost reduction and reduction of the cross sectional area of the protruded pole. Accordingly, the motor characteristic, such as startup torque, is improved.

What is claimed is:

1. A laminated core for a motor, comprising:

a plurality of core members, made of magnetic material, which are laminated in a laminate direction to form laminated core members, said laminated core members including outer core members located at opposite end sides in the laminate direction and inner core members disposed therebetween; and insulating layers formed on surfaces of the laminated core members,
wherein the insulating layers are respectively formed on the outer core members located on the opposite end sides of the laminated core in the laminate direction but are not formed on the inner core members, and
further wherein each of the outer core members has a width that is larger than a width of the inner core members.

2. The laminated core as claimed in claim 1, further comprising:

a wire wound on the insulating layers of the outer core members

3. The laminate core for a motor as claimed in claim 1, wherein the laminated core members include an intermediate core member at a middle portion of the laminated core members and the intermediate core member is covered with an insulating layer.

4. The laminate core for a motor as claimed in claim 1, wherein punched out crooked faces of the outer core members located on opposite end sides of the laminated core are bent along the laminated core members.

5. A laminated core for a motor, comprising:

a plurality of core members punched out to have a preset pattern, the core members being laminated to form a laminated core member including outer core members located at opposite end sides and inner core members disposed therebetween; and insulating layers formed on surfaces of the laminated core member,
wherein the insulating layers are formed on the outer core members located on the opposite end sides of the laminated core member but are not formed on the inner core members, and punched out crooked faces of the outer core members located on the opposite end sides of the laminated core member are confronted with each other, and
further wherein each of the outer core members has a width that is larger than a width of the inner core members.

6. The laminated core as claimed in claim 5, further comprising:

a wire wound on the insulating layers of the outer core members.

7. The laminate core for a motor as claimed in claim 5, wherein the laminated core member includes an intermediate core member at a middle portion of the laminated core member and the intermediate core member is covered with an insulating layer.

8. The laminate core for a motor as claimed in claim 5, wherein the punched out crooked faces of the outer core members located on opposite end sides of the laminated core member are bent along the laminated core member.

* * * * *